United States Patent
Ochiai et al.

(10) Patent No.: US 7,331,602 B2
(45) Date of Patent: Feb. 19, 2008

(54) HEAD-PROTECTING AIRBAG

(75) Inventors: Yasuo Ochiai, Aichi (JP); Takanobu Ikeda, Aichi (JP); Tadashi Yamada, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 166 days.

(21) Appl. No.: 11/300,591

(22) Filed: Dec. 15, 2005

(65) Prior Publication Data

US 2006/0138756 A1 Jun. 29, 2006

(30) Foreign Application Priority Data

Dec. 20, 2004 (JP) ............... 2004-367980

(51) Int. Cl.
*B60R 21/16* (2006.01)
(52) U.S. Cl. ................. 280/730.2; 280/728.2
(58) Field of Classification Search ............. 280/730.2, 280/728.2
See application file for complete search history.

(56) References Cited

U.S. PATENT DOCUMENTS

| | | | |
|---|---|---|---|
| 6,382,660 B1 * | 5/2002 | Starner et al. | 280/728.2 |
| 6,530,595 B2 * | 3/2003 | Masuda et al. | 280/730.2 |
| 6,860,507 B2 * | 3/2005 | Uchiyama et al. | 280/730.2 |
| 6,883,826 B2 * | 4/2005 | Fujiwara | 280/730.2 |
| 7,077,426 B2 * | 7/2006 | Shaker et al. | 280/730.2 |
| 7,080,853 B2 * | 7/2006 | Ogata | 280/730.2 |

FOREIGN PATENT DOCUMENTS

JP    A-2004-299483    10/2004

* cited by examiner

*Primary Examiner*—Faye M. Fleming
(74) *Attorney, Agent, or Firm*—Posz Law Group, PLC

(57) ABSTRACT

The head-protecting airbag according to the present invention is formed by hollow-weaving method, and includes a gas admissive portion inflatable with inflation gas to separate its vehicle's inner wall and vehicle's outer wall, and a non-admissive portion admitting no inflation gas. The non-admissive portion includes mounting portions arranged in the upper edge of the airbag, and a marginal portion located around the gas admissive portion. The non-admissive portion partially has a two-ply structure where the hollow-woven cloth material separates into vehicle's inner cloth part and outer cloth part from the marginal portion having a one-ply structure. At least one of the mounting portions is formed by folding back a region of the two-ply cloth part to have a four-ply structure. The head-protecting airbag of the present invention remains stably attached to the vehicle body without breakage of the mounting portions even when a strong tension force rapidly and directly acts on mounting-hole peripheries of the mounting portions upon airbag deployment.

6 Claims, 11 Drawing Sheets

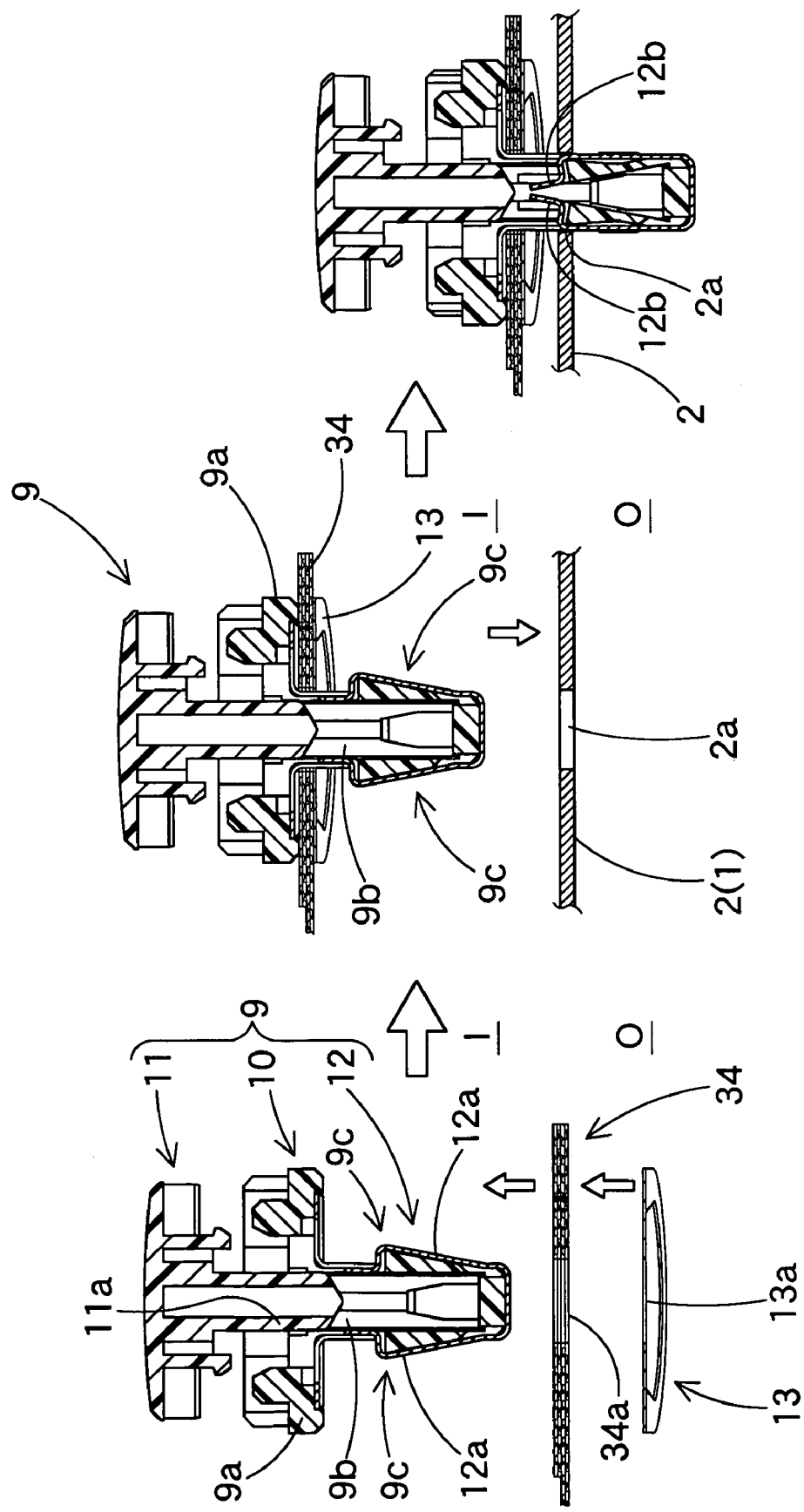

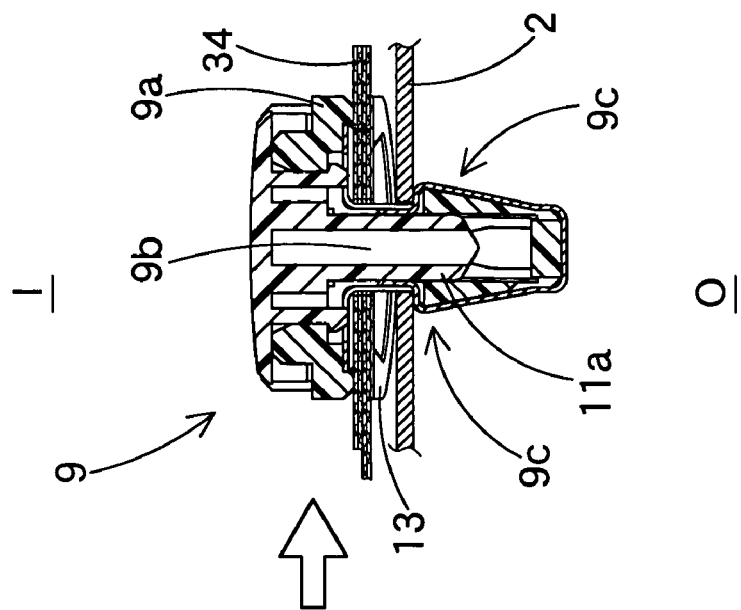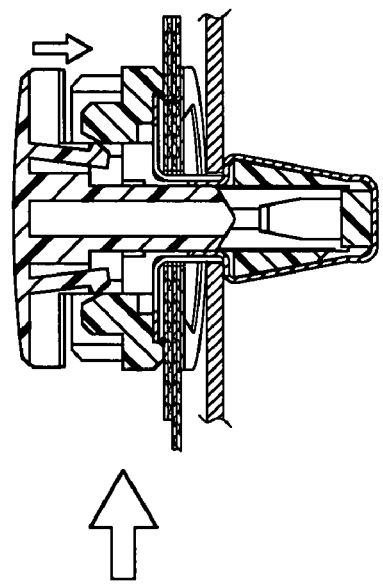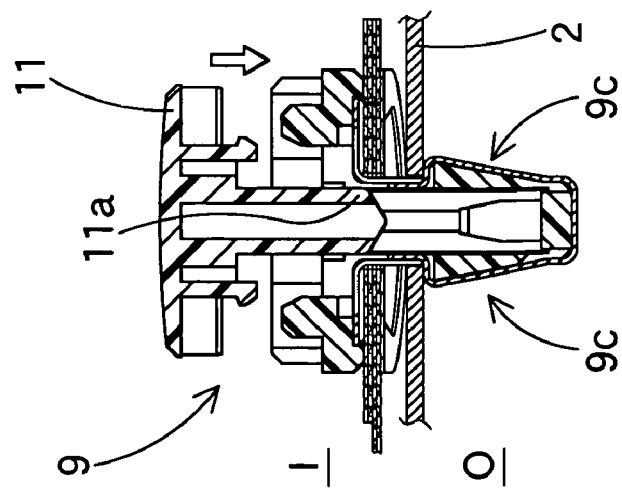

HEAD-PROTECTING AIRBAG

The present application claims priority from Japanese Patent Application No. 2004-367980 of Ochiai et al., filed on Dec. 20, 2004, the disclosure of which is hereby incorporated into the present application by reference.

BACKGROUND OF THE INVENTION

1. Field of the Invention

The present invention relates to a head-protecting airbag mountable on vehicle for protecting occupant's head, which, when fed with inflation gas, is deployable downward from upper periphery of side windows to cover the interior side of the windows.

2. Description of Related Art

In the prior art, Japanese Patent Laid-Open No. 2004-299483 is illustrative of ahead-protecting airbag folded and housed in the upper periphery of windows inside the vehicle. When fed with inflation gas, the airbag deploys downward and covers the vehicle's interior side of the windows. The airbag is provided, in its upper edge as completely inflated, with a plurality of mounting portions for attachment to the upper periphery of the windows. Each of the mounting portions includes a mounting hole.

This airbag is manufactured by hollow-weaving method. The airbag includes a gas admissive portion which admits inflation gas therein and inflates to separate its vehicle's inner wall and vehicle's outer wall, and a non-admissive portion which admits no inflation gas. The gas admissive portion includes a protective portion which inflates to cover windows. The non-admissive portion includes a peripheral portion encircling the gas admissive portion, and mounting portions.

Each of the mounting portions is coupled with a pair of holder plates, which are made of sheet metal and applied to both inner and outer sides of the mounting portion. The mounting portion is attached to the inner panel of vehicle body by inserting a bolt serving as mounting means through the mounting holes formed in the mounting portion and the holder plates, and fastening the bolt into a nut attached to the inner panel.

As described above, the mounting portions are bolt-fixed to the vehicle body utilizing the holder plates, in the head-protecting airbag of this kind. That is, the holder plates hold periphery of the mounting hole of the mounting portion by fastening by the bolt. With this construction, even if a strong downward tension force is rapidly applied to the mounting portions upon airbag inflation, the holder plates serve to counteract the tension in a bolt-fixed state. As a result, the mounting portions of the hollow-woven airbag are stably secured to the vehicle body by the holder plates.

In the case where the holder plates are not used to attach the mounting portions of the head-protecting airbag to the vehicle body, clips can be used as mounting means, for example. However, unlike the case of bolts, clips exert less holding force to hold down the periphery of the mounting hole of the mounting portion. Accordingly, if a strong downward tension force is rapidly applied to the mounting portions upon airbag deployment, the force directly acts on the inner circumference of each of the mounting holes, so that the mounting portions made of fabric may be torn in its edge opposite from the acting direction of the tension force, which may detach the mounting portions from the vehicle body.

SUMMARY OF THE INVENTION

The present invention contemplates to solve the above-mentioned problem, and therefore, has an object to provide a head-protecting airbag that remains stably attached to the vehicle body without breakage of its mounting portions even when a strong tension force rapidly and directly acts on peripheries of mounting holes of the mounting portions upon airbag deployment.

The head-protecting airbag of the present invention is folded and housed in the upper periphery of windows inside a vehicle, and deploys to cover the inner side of the windows when fed with inflation gas. The airbag is formed by hollow-weaving method, and includes a gas admissive portion inflatable with inflation gas to separate its vehicle's inner wall and vehicle's outer wall, and a non-admissive portion admitting no inflation gas. The non-admissive portion includes mounting portions for attaching the airbag to vehicle body in the upper periphery of the windows, and a marginal portion located around the gas admissive portion. The mounting portions are arranged in plurality in the upper edge of the airbag as deployed, and each of the mounting portions is provided with a mounting hole for inserting a mounting member for attachment to the vehicle body therethrough. The non-admissive portion partially has a two-ply structure where the hollow-woven cloth material separates into vehicle's inner cloth part and outer cloth part from the marginal portion having a one-ply structure, and at least one of the mounting portions is formed by folding back a region of the two-ply cloth part to have a four-ply structure.

In the head-protecting airbag of the present invention, at least one of the mounting portions has a four-ply structure, and the inner circumference of the mounting hole contacts with the mounting member. With this construction, when a strong tension force rapidly acts on the mounting portion upon airbag deployment, the force is dispersed to each part of the four-ply structure. As a result, the strength of the mounting portion is improved enough to counteract the tension force without breakage.

The mounting portion of the present invention was put to comparison with a comparative example whose mounting portion has a two-ply structure formed by folding back a one-ply region of the hollow-woven material. The mounting portion of the present invention having a four-ply structure and the counterpart of the comparative example have generally the same number of warps and wefts per unit area. However, in the mounting portion of the present invention, the tension force can be dispersed to four cloth part, whereas the force is dispersed to two cloth part in the comparative example. As a result, the mounting portion of the present invention was proved to have a greater tensile strength than that of the comparative example.

Therefore, the head-protecting airbag of the present invention remains stably attached to the vehicle body without breakage of the mounting portion even when a strong tension force rapidly and directly acts on the mounting hole periphery of the mounting portion upon airbag deployment.

Moreover, the mounting portion is formed of part of the hollow-woven material which is manufactured at the same time as the gas admissive portion and the marginal portion, but not by a separate member from the hollow-woven fabric. Accordingly, the airbag is manufactured with less man-hour and less cost.

The mounting portion having a four-ply structure may be provided, in the periphery of the mounting hole and in an opposite side of the direction toward which a tension force acts upon airbag deployment, with a stitched-up portion that stitches up the four-ply cloth by sewing yarn.

With this construction, the sewing yarn in the stitched-up portion reinforces the periphery of the mounting hole in the opposite side of the acting direction of the tension force. Accordingly, even if the inner circumference of the mounting hole butted against the mounting member is torn upon airbag deployment, the tear stops at the stitched-up portion.

As a result, the airbag remains attached to the vehicle body by the mounting portion in a further stable manner.

The stitched-up portion desirably has an inverted-U shape enclosing the mounting hole from upper side and front and rear sides. With this construction, not only in the case the tension force acts downward, but also in the case the force acts diagonally forward and downward or diagonally rearward and downward, the mounting portion is capable of counteracting the force. In other words, even if the front or rear periphery of the mounting hole is torn and the tear is likely to extend forward or rearward, the stitched-up portion stops the tear easily.

If the airbag includes a joint cloth prepared separately from the remaining part of the airbag and sewn thereto as part of the non-admissive portion, the joint cloth is desirably sewn to the remaining part of the airbag with the same sewing yarn as that for forming the stitched-up portion, at the same time as a sewing work of the stitched-up portion. The joint cloth serves to define the entire shape of the airbag, and to reduce the volume of the gas admissive portion so that the time to complete airbag inflation is reduced. If the joint cloth is manufactured separately from an airbag part including the gas admissive portion, the contour of the part including the gas admissive portion integrally hollow-woven, as well as that of the joint cloth can be smaller. This construction facilitates allocation of the gas admissive portion or the joint cloth in cutting out those members from hollow-woven material, which contributes to reduce remaining material and improve the extraction rate from the material.

In addition, the sewing work of the joint cloth and the stitched-up portion can be done at the same time using the same sewing yarn, by lock stitch, chain stitch or the like, so that the number of man-hour for manufacturing the airbag is reduced.

The two-ply cloth part may include connecting portions dotted about the cloth part which portions connecting the vehicle's inner cloth part and outer cloth part of the two-ply part together. Each of the connecting portions is formed by weaving a warp or a weft of at least one of the inner or outer cloth part into the other cloth part.

With this construction, the connecting portions help prevent the two cloth part from being out of neatly overlapped configuration before the two-ply region is folded back into four-ply state. Consequently, the folding work of the two-ply region into a four-ply mounting portion, into a predetermined dimension and contour, is facilitated.

It is desired that the two-ply region for defining the mounting portion is provided in the lower edge thereof with a slit extending along the front-rear direction of the airbag, and that the mounting portion is formed by folding back the two-ply region on a fold extending upward from an end of the slit.

With this construction, vertical dimension of the hollow-woven material of the airbag can be less in comparison with the case a region for defining the mounting portion is prepared in a vertically extending manner. In other words, if the mounting portion is formed by folding back a two-ply region projecting upward from the upper edge of the airbag, at a fold extending along the front-rear direction, the vertical dimension of the hollow-woven material must be greater by the length of the mounting portion. This construction will produce extra material around the two-ply region, especially in front and rear thereof. In contrast, if the mounting portion is formed of the two-ply region provided at its lower edge with a slit extending along the front-rear direction, by folding back the region at a fold extending upward from the end of the slit, as in the present invention, the dimension of the two-ply region projecting upward from the airbag upper edge is reduced, so that less extra material is produced.

BRIEF DESCRIPTION OF DRAWINGS

FIGS. 9A, 9B, 9C, 10A, 10B, and 10C illustrate attachment process of the mounting portion to the vehicle body in order.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
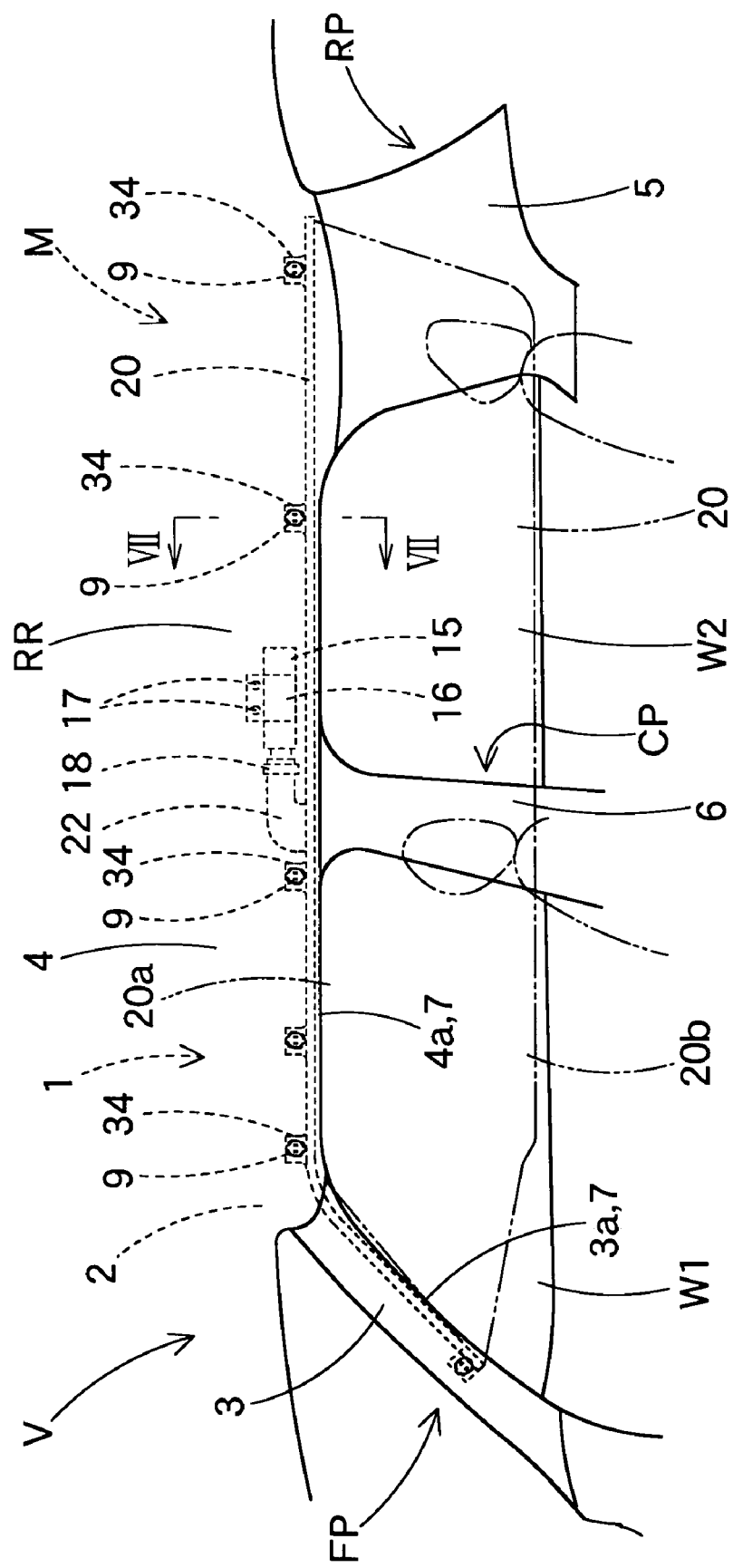
FIG. 1 is a schematic front view of an airbag apparatus employing a head-protecting airbag embodying the present invention, as mounted on a vehicle.
Figure 2:
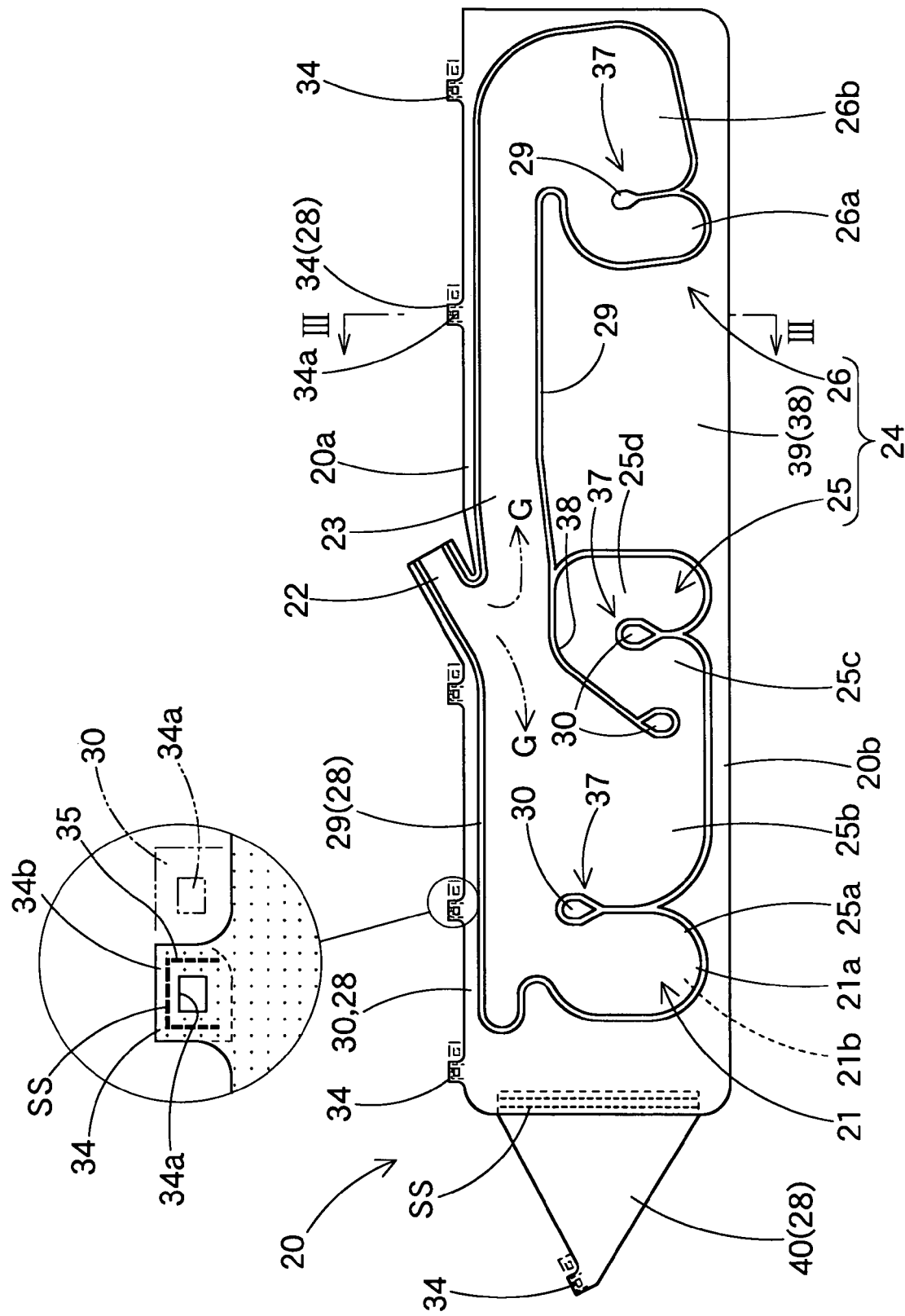
FIG. 2 is a front view of the airbag in the embodiment.
Figure 3:
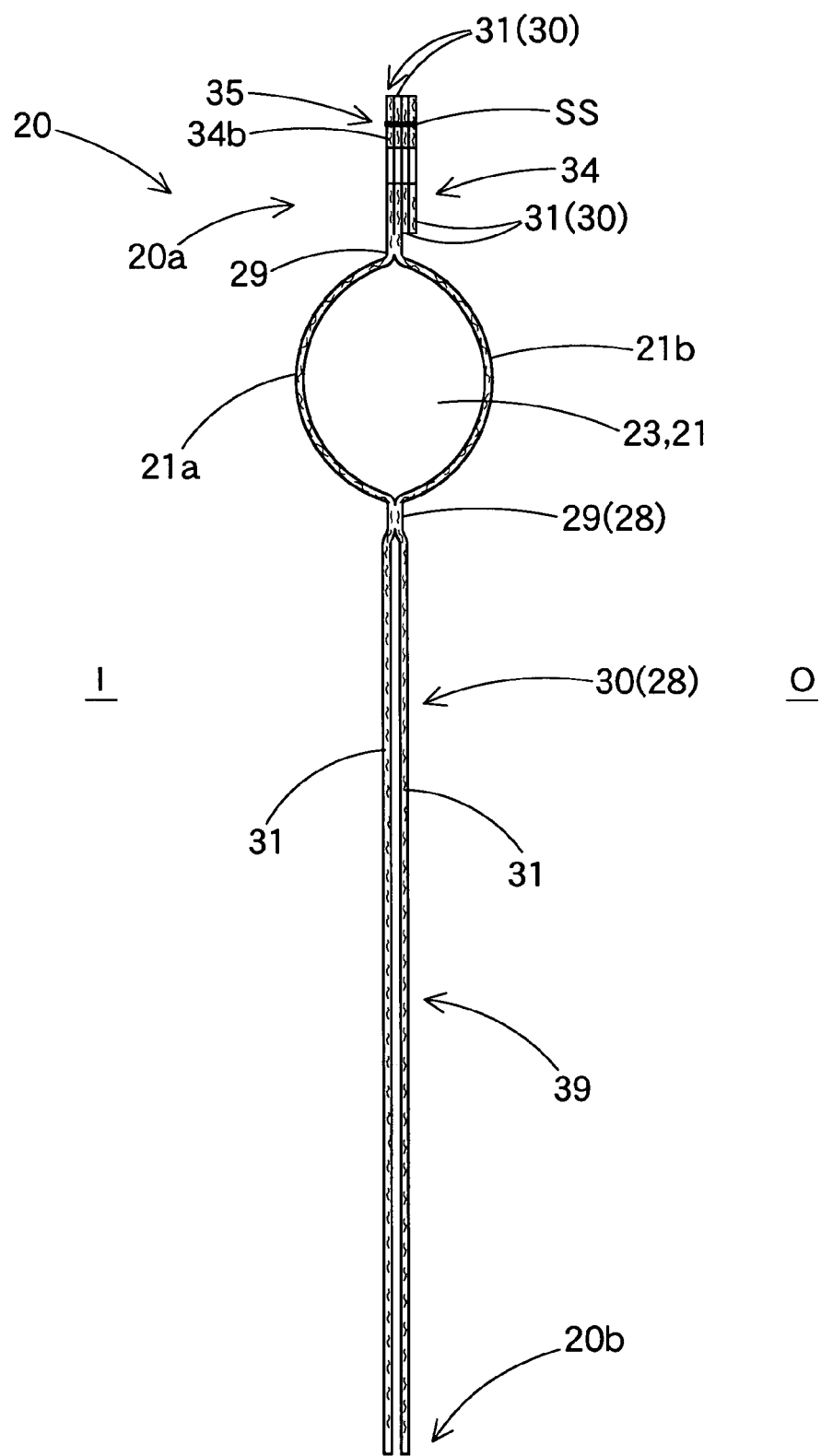
FIG. 3 is a sectional view of the airbag of FIG. 2 as inflated, taken along line III-III in FIG. 2.
Figure 7:
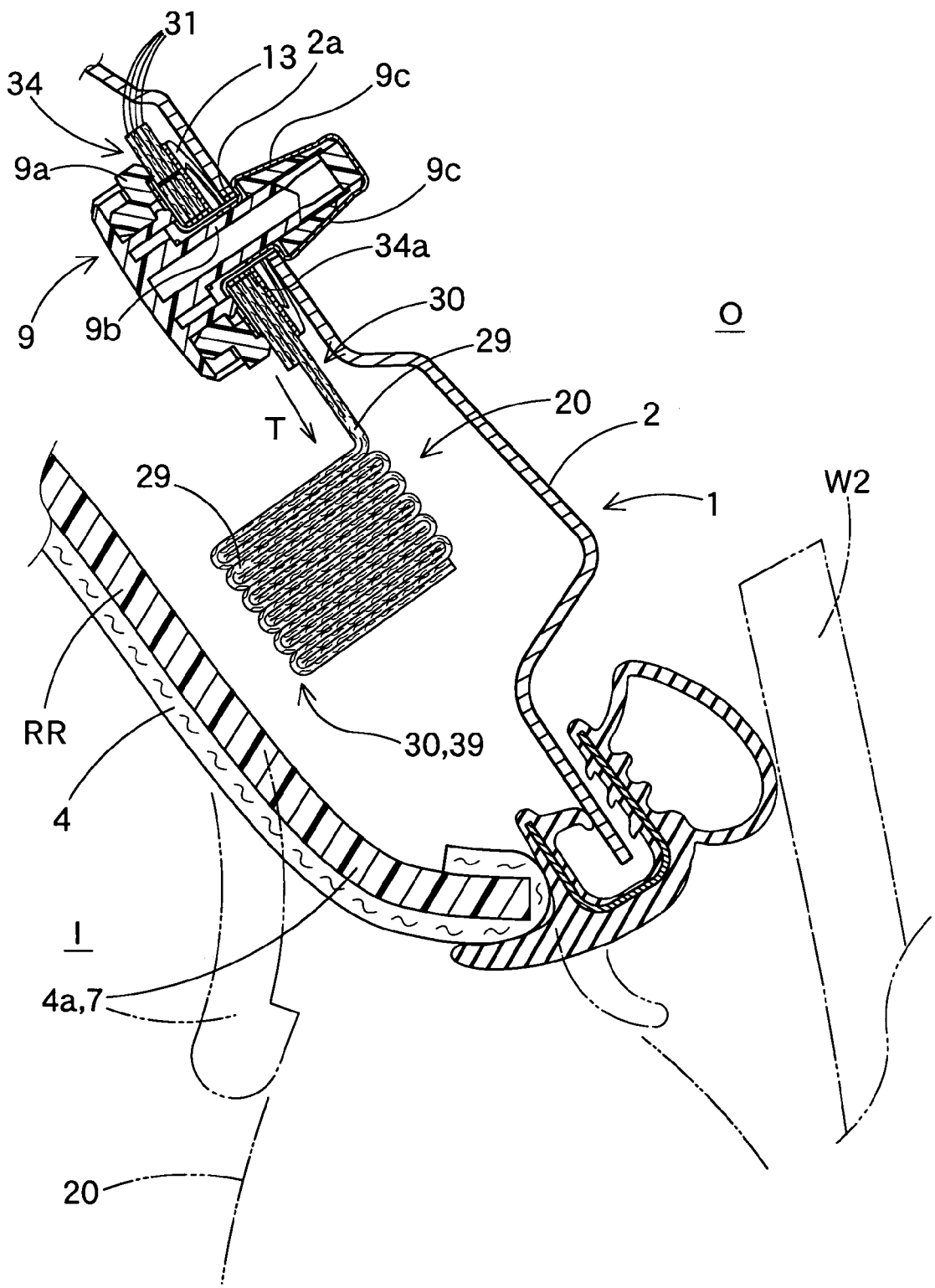
FIG. 7 is a sectional view of the airbag of FIG. 2 as mounted on the vehicle, taken along line VII-VII of FIG. 1.

As shown in FIGS. 1 and 2, the head-protecting airbag 20 embodying the present invention is used in a head-protecting airbag apparatus M mountable on a vehicle V. The head-protecting airbag apparatus M includes an airbag 20, an airbag cover 7, clips 9, support plates 13, an inflator 15, and a mounting bracket 16, as shown in FIGS. 1 and 7. The airbag 20 is folded and housed along upper periphery of side windows W1 and W2 inside the vehicle V, in a range from lower edge part of the front pillar FP to upper side of the rear pillar RP, via lower edge of the roof side rail RR.

As shown in FIG. 1, the inflator 15 has a substantially cylindrical shape. The inflator 15 is sheathed with a joint port 22 of the airbag 20 for introducing inflation gas, and connected with the joint port 22 by a clamp 18. The inflator 15 is secured to the inner panel 2 in the roof side rail RR by the mounting bracket 16 above the center pillar CP while being covered by a lower edge portion 4a of the roof head lining 4. The inner panel 2 is part of the vehicle body 1. The mounting bracket 16 is made of sheet metal, and is secured to the inner panel 2 by bolts 17 while holding the inflator 15.

The airbag cover 7 is composed of a lower edge portion 3a of the pillar garnish 3 arranged in the front pillar FP, and the lower edge portion 4a of the roof head lining 4 arranged in the roof side rail RR. The front pillar garnish 3 and the roof head lining 4 are made from synthetic resin, and are secured to the vehicle's interior side of the inner panel 2 in the front pillar FP and the roof side rail RR. The roof head lining 4 is arranged from upper side of the front pillar FP through upper side of the rear pillar RP, via upper side of the center pillar CP.

Figure 8:
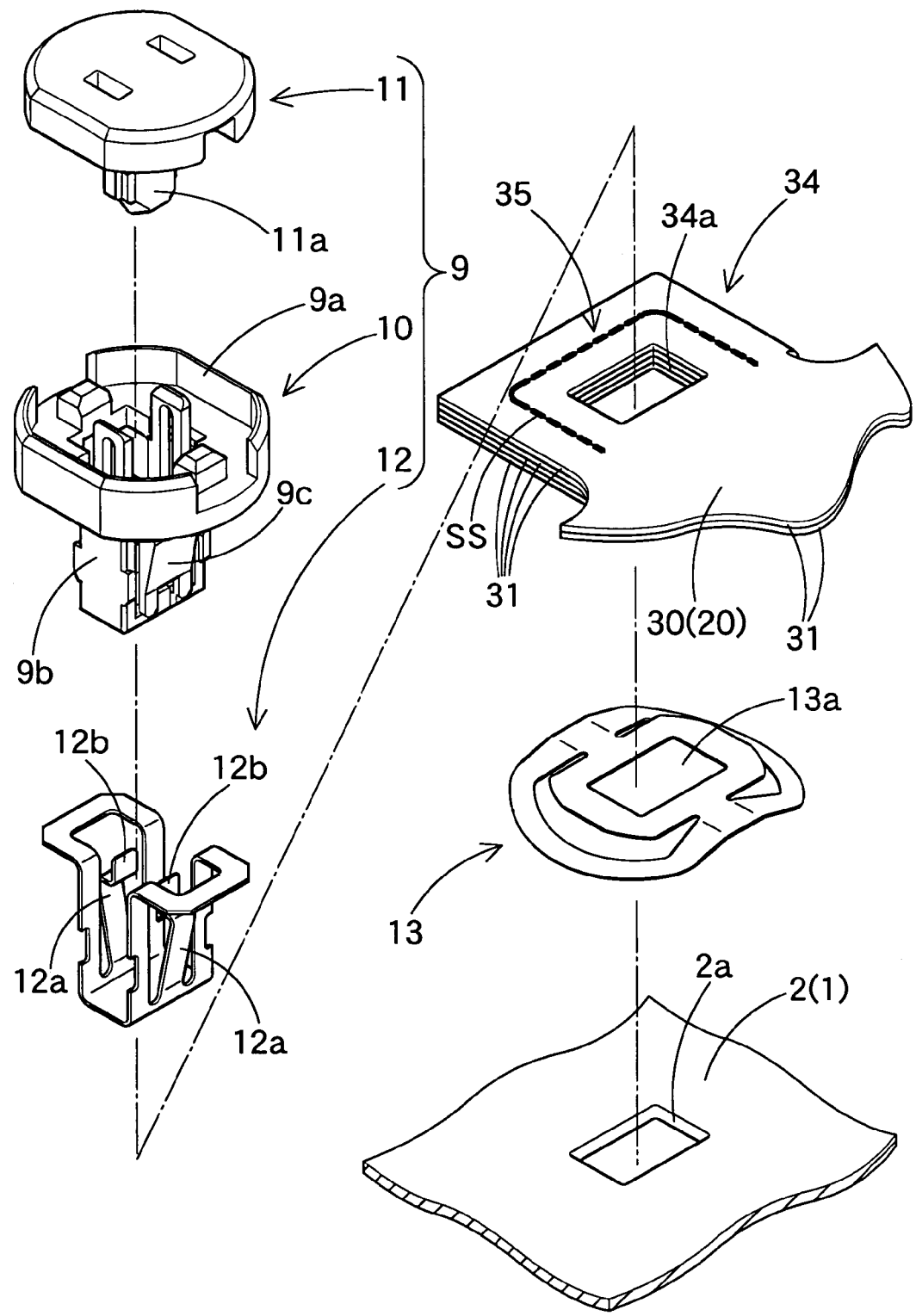
FIG. 8 is an exploded perspective view of a clip to attach the airbag of FIG. 2 to the vehicle body.

The clips 9 serve as mounting means to mount mounting portions 34 of the airbag 20 to the inner panel 2 as part of the vehicle body 1, and are connected to the inner panel 2. As shown in FIGS. 8 to 10, each of the clips, as its basic structure, includes a head 9a and a shaft 9b projected from the head 9a. The shaft 9b has a pair of retaining legs 9c so expanding as they head for the root side from the leading end as to be away from each other. If the pair of retaining legs 9c is inserted into a fixing slot 2a of the inner panel 2 via a mounting hole 34a of the mounting portion 34 of the airbag 20, the clip 9 is retained by the vehicle's outer periphery of the fixing slot 2a. Thus the clips 9 attach the mounting portions 34 to the inner panel 2.

Each of the clips 9 includes three components: a body 10, a locking part 11 and a cover part 12. The clip body 10 and the locking part 11 are made from synthetic resin such as polyacetal, polyamide or the like, whereas the cover part 12 is made of metallic plate spring. The clip body 10 defines major part of the head 9a and the shaft 9b including the retaining legs 9c. The locking part 11 serves to improve the retention of the retaining legs 9c in the periphery of the fixing slot 2a. The locking part 11 includes a spacer 11a. The spacer 11a is inserted in between the retaining legs 9c which have been retained by the fixing slot periphery in order to prevent the legs 9c from coming close to each other. The cover part 12 is mounted on the outer surface of the retaining legs 9c to reinforce the legs 9c, and includes retaining lugs 12a which are directly butted against the periphery of the fixing slot 2a in the retention of the retaining legs 9c.

Initially, the locking part 11 is provisionally held by the clip body 10 so that the spacer 11a may not be inserted in between the retaining legs 9c immediately. In other words, the locking part 11 is assembled with the clip body 10 such that the spacer 11a may be inserted in between the retaining legs 9c by pushing-in of the locking part 11 after the retaining legs 9c were retained by the periphery of fixing slot 2a. The cover part 12 is detachably assembled with the clip body 11.

As shown in FIGS. 8 to 10, the support plate 13 is made of metallic plate spring, and is provided with a through hole 13a for inserting the shaft 9b of the clip 9 therethrough such that the retaining legs 9c retain the periphery of the through hole 13a. The support plate 13 serves to bias the head 9a side of the clip 9 away from the inner panel 2 when the clip 9 attaches the mounting portion 34 of the airbag 20 to the inner panel 2, such that the clip 9 does not make abnormal noise due to jolting. More specifically, referring to FIGS. 9A and 9B, the support plate 13 is firstly applied to the vehicle's outer side O of the mounting portion 34 of the airbag 20, and in that state, the shaft 9b of the clip 9 is put through the support plate 13. Then peripheries of the mounting hole 34a and the through hole 13a are located between the retaining legs 9c and the head 9a of the clip 9. Then to attach the mounting portion 34 to the inner panel 2, as shown in FIGS. 9B, 9C and 10A, the retaining legs 9c are so inserted into the fixing slot 2a as to be retained in the outer side O of the fixing slot periphery. At this time, the support plate 13 biases the head 9a of the clip 9 away from the inner panel 2.

Referring to FIGS. 1 to 7, the airbag 20 is manufactured by hollow-weaving method of polyamide yarn or the like. When fed with inflation gas G from the inflator 15, the airbag 20 is developed from folded state and deploys to cover vehicle's interior side I of side windows W1, W2 and pillar garnishes 6 and 5 at the center pillar CP and the rear pillar RP. The airbag 20 includes a gas admissive portion 21 which admits inflation gas G inside to separate its vehicle's inner wall 21a and vehicle's outer wall 21b, and a non-admissive portion 28 which admits no inflation gas G.

In the preferred embodiment, the gas admissive portion 21 includes a joint port 22, a gas feed passage 23 and a protective portion 24. The gas feed passage 23 extends straightly in the front-rear direction of the vehicle V along the upper edge 20a of the airbag 20. In a generally longitudinal center of the gas feed passage 23 is the joint port 22 extending upward for introducing inflation gas G from the inflator 15 into the gas admissive portion 21. The gas feed passage 23 supplies inflation gas G from the joint port 22 both forward and rearward of the vehicle V.

The protective portion 24 serves to protect occupant's head seated in the vehicle V. The protective portion 24 includes a front protective portion 25 and a rear protective portion 26, which are partitioned to front and rear by a later-described panel portion 39. The front protective portion 25 is arranged below the front part of the gas feed passage 23, and is located at the side of front seat of the vehicle V to cover the side window W1 located at the side of front seat upon deployment of the airbag 20. The rear protective portion 26 is arranged below the rear part of the gas feed passage 23, and is located at the side of rear seat of the vehicle V to cover the side window W2 located at the side of rear seat, upon airbag deployment. The protective portion 25 includes inflatable cells 25a, 25b, 25c and 25d, whereas the protective portion 26 includes inflatable cells 26a and 26b. These cells 25a, 25b, 25c, 25d, 26a and 26b are partitioned by later-described partitioning portions 37 and 38 to line up in the front-rear direction of vehicle V.

The non-admissive portion 28 includes a marginal portion 29, mounting portions 34, partitioning portions 37 and 38, a panel portion 39, and a joint cloth 40. The marginal portion 29 is located to encircle the gas admissive portion 21.

The panel portion 39 has a rectangular plate shape, and is located between the front and rear protective portions 25 and 26 below the gas feed passage 23. The panel portion 39 serves to define the entire shape of the airbag 20, and also to reduce the volume of the gas admissive portion 21 so that the time to complete inflation of the airbag 20 is reduced.

The partitioning portions 37 and 38 are located inside the front and rear protective portions 25 and 26. The partitioning portions 37 are formed in such a manner as to enter into the protective portion 25 or 26 from the lower edge of the marginal portion 29. The partitioning portion 38 extends forward and downward from the upper front end of the panel portion 39. The partitioning portions 37 and 38 serve to regulate thickness of the protective portions 25 and 26 as inflated by partitioning the front and rear protective portions 25 and 26, respectively, into cells 25a, 25b, 25c, 25d, 26a and 26b. Thus the protective portions 25 and 26 are inflated flatly, not spherically.

The joint cloth 40 is sewn to the front end of the airbag 20, as shown in FIG. 2. As well as the panel portion 39, the joint cloth 40 serves to define the entire shape of the airbag 20, and to reduce the volume of the gas admissive portion 21 so that the time to complete inflation of the airbag 20 is reduced. Moreover, since the joint cloth 40 is manufactured separately from the remaining part of the airbag 20 including the gas admissive portion 21, the contour of the gas admissive portion 21 part integrally formed by hollow-weaving method, as well as that of the joint cloth 40 can be smaller. This construction facilitates allocation of the gas admissive portion 21 part or the joint cloth 40 in cutting out those members from hollow-woven material, which contributes to reduce remaining material and improve extraction rate from the material.

In the preferred embodiment, the non-admissive portion 28 has, immediately after being hollow-woven and cut, a double-wall, or two-ply structure except the marginal portion 29. The marginal portion 29 has a one-ply structure in which the walls 21a and 21b are joined to each other. Two cloth part 31 extending from the marginal portion 29 in a separating manner toward vehicle's inner side I and outer side O define a two-ply part 30 in an opposite side of the gas admissive portion 21 with respect to the marginal portion 29 (refer to FIG. 3). Each cloth part 31 is woven of generally the same number of warps and wefts per square inch as the vehicle's inner wall 21a or outer wall 21b of the gas admissive portion 21.

Figure 5:
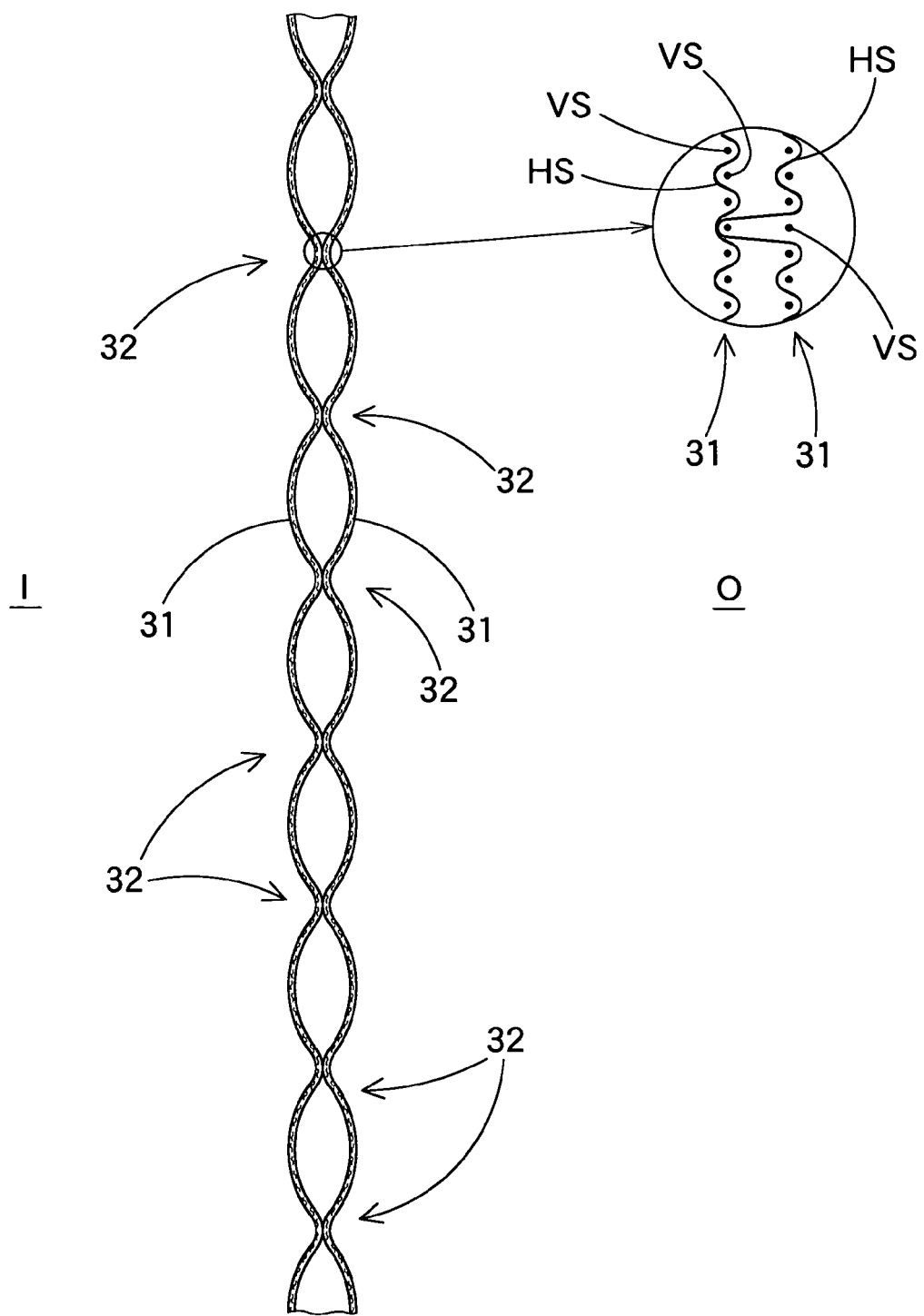
FIG. 5 is a sectional view of the region of FIG. 4A, taken along line V-V in FIG. 4A.
Figure 6:
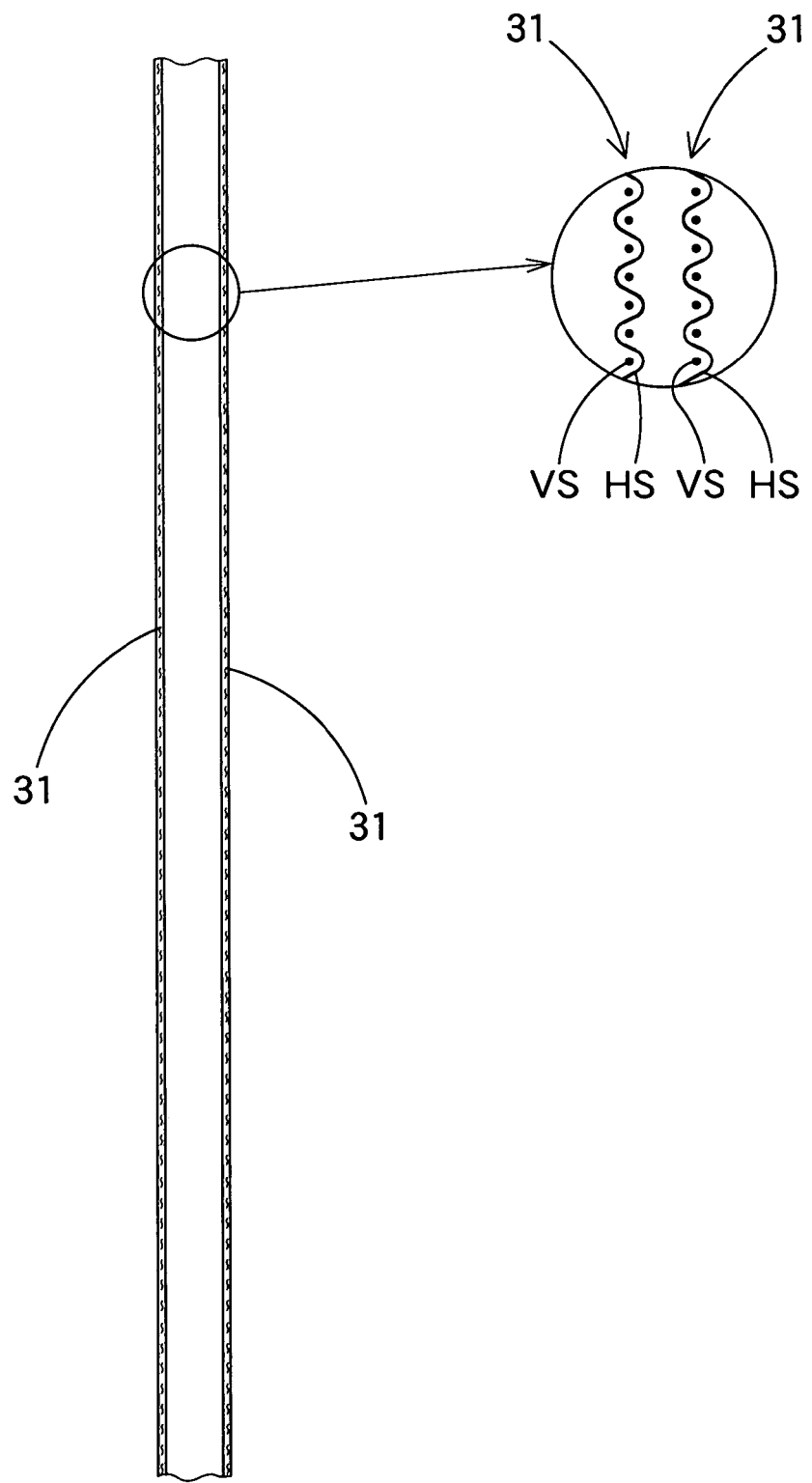
FIG. 6 is a sectional view of the region of FIG. 4A, taken along line VI-VI in FIG. 4A.

As shown in FIGS. 5 and 6, the two-ply cloth part 30 is provided with numbers of connecting portions 32 in a dotted manner. Each of the connecting portions 32 is formed in such a manner that a warp VS or a weft HS of one of the cloth part 31 is woven into the other cloth part 31. The two-ply part 30 having the connecting portions 32 defines the panel portion 39, the joint cloth 40, and part of the partitioning portions 37 and 38.

Each of the mounting portions 34 is formed by folding back a region of the two-ply part 30, thereby has a four-ply structure of the cloth 31. The airbag 20 includes a plurality of (six, in the illustrated embodiment) mounting portions 34 inclusive of the joint cloth 40. Each of the mounting portions 34 projects upward from the upper edge section 20a of the airbag 20, and is provided with a mounting hole 34a having a generally rectangular shape, and to insert the shaft 9b of the clip 9 therethrough.

When the airbag 20 is cut out from hollow-woven fabric, each of the mounting portions 34 is provided with a slit C and the mounting hole 34a, as shown in FIG. 4. Then the mounting portion 34 is formed by folding back a two-ply region at a fold B. In the preferred embodiment, the mounting portion 34 is further provided with a stitched-up portion 35, in a periphery 34b of the mounting hole 34a in an opposite side of the direction toward which a tension force F (refer to FIG. 7) acts upon airbag deployment, i.e., in an upper periphery 34b, in the illustrated embodiment. The stitched-up portion 35 stitches up the four-ply cloth 31 by sewing yarn SS in an inverted-U shape. The sewing yarn SS is the same yarn as used to sew up the joint cloth 40. Accordingly, the sewing work of the joint cloth 40 and the stitched-up portion 35 can be done at the same time using the same sewing yarn SS, by lock stitch, chain stitch or the like, so that the number of man-hour for manufacturing the airbag 20 is reduced.

As described above, the airbag 20 is manufactured through processes of hollow-weaving, cutting, punching of the mounting hole 34a, folding back predetermined regions to form the mounting portions 34, and sewing of the joint cloth 40 and the stitched-up portion 35.

Now described is how to mount the head-protecting airbag 20 thus manufactured on the vehicle V. Firstly, the airbag 20 is folded up such that its lower edge 20b is brought close to its upper edge 20a, in a bellows fashion, for example. Then a breakable tape member is wound around the airbag 20 at predetermined positions to keep the folded-up configuration.

Subsequently, the inflator 15 coupled with the mounting bracket 16 is connected to the joint port 22 of the airbag 20 with the clamp 18. Then as shown in FIGS. 9A and 9B, the support plate 13 is applied to the vehicle's outer side O of each of the mounting portions 34 of the airbag 20, and the shaft 9b of the clip 9 is inserted through the mounting hole 34a and the through hole 13a from inner side I of the mounting portion 34. Then if the retaining legs 9c are retained by the vehicle's outer side periphery of the through hole 13a, an airbag module is completed.

Thereafter, the mounting bracket 16 is disposed at a predetermined position of the inner panel 2 and bolt 17 fixed, so that the inflator 15 is secured to the inner panel 2. Then as shown in FIGS. 9B, 9C and 10A, the shafts 9b of the clips 9 are inserted into the fixing slots 2a of the inner panel 2 from inner side I so that the retaining legs 9c are retained by outer side periphery of the fixing slots 2a. Then as shown in FIGS. 10B and 10C, the locking parts 11 of the clips 9 are pushed in to insert the spacers 11a in between the retaining legs 9c, so that the mounting portions 34 are attached to the inner panel 2, and the airbag module is mounted on the vehicle body 1. Subsequently, an unillustrated lead wire extending from a predetermined control for actuating the inflator is connected to the inflator 15. If the front pillar garnish 3, the roof head lining 4, and then the rear pillar garnish 5 and the center pillar garnish 6 are attached to the vehicle body 1, the airbag apparatus M is mounted on the vehicle V.

To remove each of the mounting portions 34 from the vehicle body 1, the locking part 11 of the clip 9 is detached from the clip body 10. Then grasping pieces 12b located at the leading ends of the retaining lugs 12a of the cover part 12 are pinched to bring the retaining legs 9c close to each other, and the retaining legs 9c are pulled out of the fixing slot 2a. Thus the mounting portion 34 is removed from the vehicle body 1.

When the inflator 15 is actuated after mounting of the airbag apparatus M on the vehicle V, inflation gas G discharged from the inflator 15 flows into the gas feed passage 23 of the airbag 20 via the joint port 22, and flows therein in opposite directions in the front-rear direction, as indicated by double-dotted lines in FIG. 2. Then the gas G enters each of the front and rear protective portions 25 and 26, and the protective portions 25 and 26 start to unfold and inflate. The airbag 20 then breaks the tape member wound therearound, pushes and opens the airbag cover 7 in the lower edges 3a and 4a of the front pillar garnish 3 and the roof head lining 4, and inflates to cover the inner side I of the side windows W1 and W2, the center pillar CP, and the rear pillar RP while protruding downward, as indicated by double-dotted lines in FIGS. 1 and 7.

In the head-protecting airbag 20 of the preferred embodiment, each of the mounting portions 34 has a four-ply structure of the cloth 31, and the inner circumference of the mounting hole 34a contacts with the shaft 9b of the clip 9 serving as mounting means. With this construction, when a strong tension force T rapidly acts on the mounting portions 34 upon airbag deployment, as shown in FIG. 7, the tension force T is dispersed to each cloth 31, so that the strength of the mounting portion 34 is improved enough to counteract the force T without breakage.

Therefore, the head-protecting airbag 20 of the embodiment remains stably attached to the vehicle body 1 without breakage of the mounting portions 34 even when a strong tension force T rapidly and directly acts on peripheries of the mounting holes 34a of the mounting portions 34 upon airbag deployment.

Moreover, the mounting portions 34 of the foregoing embodiment are formed of the cloth 31, or part of the hollow-woven material and manufactured at the same time as the gas admissive portion 21 and the marginal portion 29, but not from separate member from the hollow-woven fabric. Accordingly, the airbag 20 is manufactured with less man-hour and less cost.

In the foregoing embodiment, each of the mounting portions 34 is provided with the stitched-up portion 35, in the periphery 34b of the mounting hole 34a in the opposite side of the direction of a tension force F applied upon airbag deployment. The stitched-up portion 35 stitches up the four-ply cloth 31 by the sewing yarn SS. With this construction, the sewing yarn SS reinforces the periphery 34b of the mounting hole 34a located in the opposite side of the acting direction of the tension force T. Accordingly, even if the inner circumference of the mounting hole 34a butted against the clip shaft 9b is torn upon airbag deployment, the tear stops at the stitched-up portion 35. As a result, the airbag 20 remains attached to the vehicle body 1 by the mounting portions 34 in a further stable manner.

Moreover, the stitched-up portion 35 has such an inverted U-shape as to enclose the mounting hole 34a from upper side and front and rear sides. Accordingly, not only in the case the tension force T acts downward, but also in the case the force T acts diagonally forward and downward or diagonally rearward and downward, the mounting portion 34 is capable of counteracting the force T. In other words, even if the front or rear periphery of the mounting hole 34a is torn and the tear is likely to extend forward or rearward, the stitched-up portion 35 stops the tear easily.

The mounting portion 34 of the foregoing embodiment was put to comparison with a comparative example whose mounting portion has a two-ply structure formed by folding back a one-ply region of a hollow-woven material, and is provided with the same stitched-up portion 35 as that of the foregoing embodiment. The mounting portion 34 of the foregoing embodiment and the counterpart of the comparative example have generally the same number of warps and wefts per unit area. However, in the mounting portion 34 of the foregoing embodiment, the tension force can be dispersed to four cloth part, whereas the force is dispersed to two cloth part in the comparative example. As a result, the mounting portion 34 of the foregoing embodiment was proved to have about 1.9 times greater tensile strength than the comparative example. In a test where respective airbags having mounting portions of the embodiment and the comparative example are mounted on the vehicle with the clips 9 and actuated, the mounting portions of the comparative example broke. In contrast, the airbag 20 of the embodiment remained attached to the vehicle body 1 without breakage of the mounting portions 34. It is only in a construction of the mounting portions that the two airbags of the embodiment and of the comparative example differ from each other.

Moreover, in the foregoing embodiment, the two-ply part 30 of the airbag 20 is formed to separate into two inner and outer cloth part 31 from the marginal portion 29 in the hollow-weaving work, but in such a manner that the inner and outer cloth part 31 are linked with the connecting portions 32 dotted thereabout. Each of the connecting portions 32 is formed in such a manner that a warp VS or a weft HS of at least one of the cloth part 31 is woven into the other cloth part 31. Accordingly, the connecting portions 32 help prevent the two sheets of cloth 31 from being out of the neatly overlapped configuration before the two-ply region to form the mounting portion 34 is folded back into four-ply state. Consequently, the folding work of the two-ply regions into the four-ply mounting portions 34 at the fold B, into a predetermined dimension and contour, is facilitated.

Figure 11:
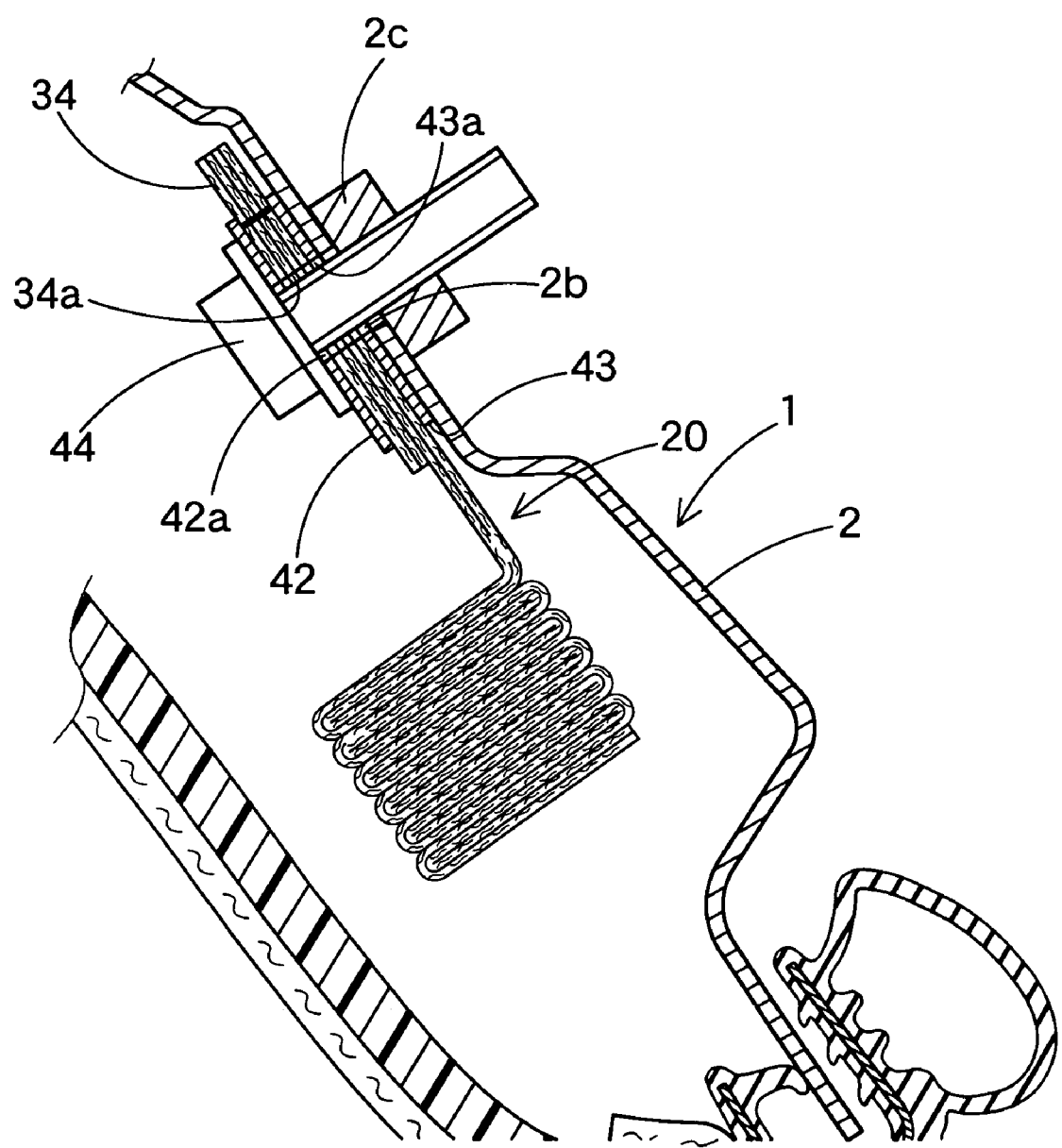
FIG. 11 shows a modified attaching manner of the mounting portion by a sectional view.

In the foregoing embodiment, all the mounting portions 34 of the airbag 20 are attached to the vehicle body 1 with the clips 9. However, it will also be appreciated that predetermined mounting portions 34 are attached to the vehicle body 1 utilizing holder plates and bolts. In that case, referring to FIG. 11, holder plates 42 and 43 are applied to vehicle's inner side I and outer side O of the predetermined mounting portions 34, and the holder plates 42 and 43 are coupled to each other. Then bolts 44 serving as mounting means are put through mounting holes 34a, 42a and 43a of the mounting portions 34 and the holder plates 42 and 43, and then fastened into nuts 2c attached to fixing slots 2b in the inner panel 2.

It will also be appreciated to attach the above holder plates 42 and 43 to the mounting portions 34, also in the case the clips 9 and the support plates 13 are used to mount the mounting portions 34 on the vehicle body 1.

Figure 4A:
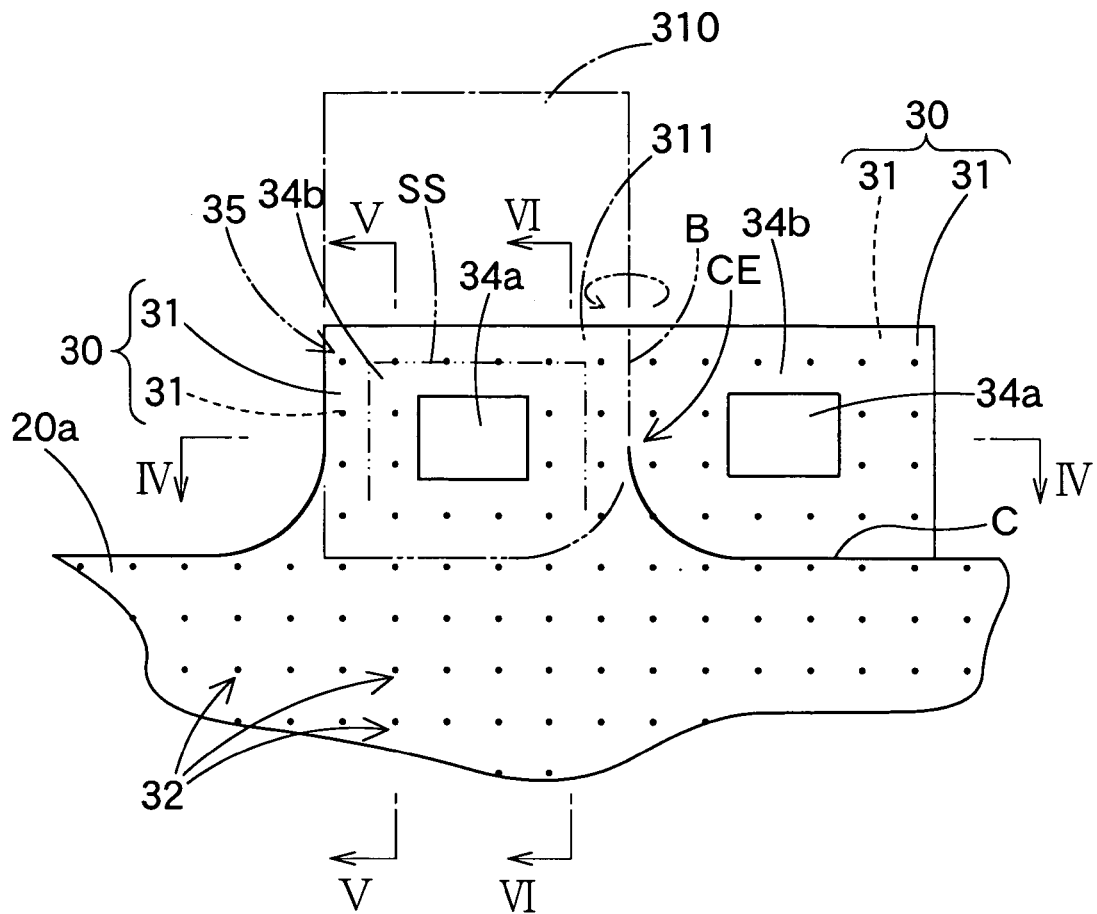
FIG. 4A is a partial enlarged view of the airbag of FIG. 2 as has just hollow-woven and cut, and shows a region for forming a mounting portion.
Figure 4B:
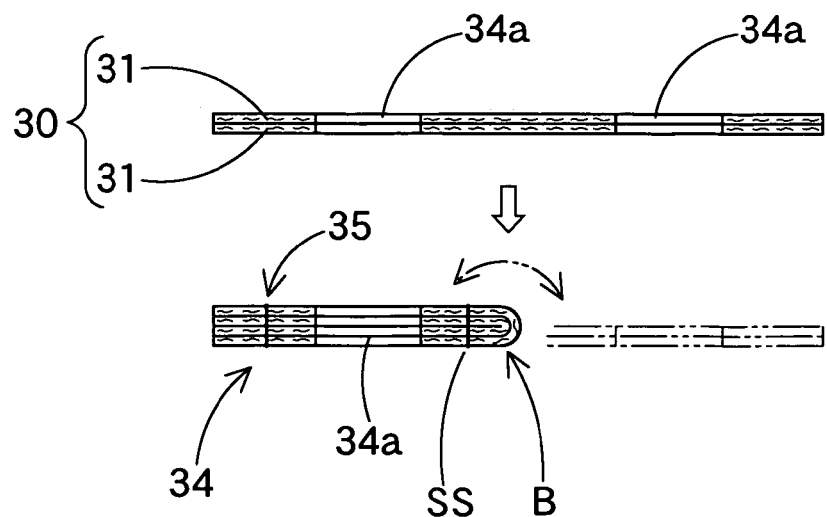
FIG. 4B is a sectional view of the region of FIG. 4A, taken along line IV-IV in FIG. 4A.

In the head-protecting airbag 20 of the preferred embodiment, furthermore, the two-ply region for defining the mounting portion 34 is provided at its lower edge with a slit C that extends along the front-rear direction of the airbag, as shown in FIGS. 4A and 4B. Then the mounting portion 34 is formed by folding back the two-ply region at the fold B that extends upward from an end CE of the slit C.

With this construction, vertical dimension of the hollow-woven material of the airbag can be less in comparison with the case a region for defining the mounting portion is prepared in a vertically extending manner. In other words, referring to single-dotted lines in FIG. 4A, if the mounting portion 34 is formed by folding back a two-ply region projecting upward from the upper edge 20a of the airbag 20, at a fold extending along the front-rear direction, such that a two-ply part 310 is laid over a two-ply part 311, the vertical dimension is increased by the length of the part 310. This construction will produce extra material around the two-ply part 310, especially in front and rear of the part 310. In contrast, if the mounting portion 34 is formed of the two-ply region provided at its lower edge with the slit C extending along the front-rear direction, by folding back the region at the fold B extending upward from the end CE of the slit C, as in the preferred embodiment, the dimension of the region projecting upward from the airbag upper edge 20a for forming the mounting portion 34 is reduced, so that less extra material is produced.

What is claimed is:

1. A head-protecting airbag folded and housed in the upper periphery of windows inside a vehicle, the airbag deploying to cover the inner side of the windows when fed with inflation gas, wherein:

the airbag is formed by hollow-weaving method;

the airbag comprises: a gas admissive portion inflatable with inflation gas to separate a vehicle's inner wall and a vehicle's outer wall each thereof; and a non-admissive portion admitting no inflation gas;

the non-admissive portion comprises: mounting portions for attaching the airbag to vehicle body in the upper periphery of the windows; and a marginal portion located around the gas admissive portion;

the mounting portions are arranged in plurality in the upper edge of the airbag as deployed, each of the mounting portions comprising a mounting hole for inserting a mounting member for attachment to the vehicle body therethrough;

the non-admissive portion partially has a two-ply structure where the hollow-woven cloth material separates into vehicle's inner cloth part and outer cloth part from the marginal portion having a one-ply structure; and at least one of the mounting portions is formed by folding back a region of the two-ply cloth part such that the region has a four-ply structure.

2. The head-protecting airbag according to claim 1, wherein:

the mounting portion having a four-ply structure comprises a stitched-up portion in a periphery of the mounting hole and in an opposite side of the direction toward which a tension force acts upon airbag deployment; and the stitched-up portion stitches up the four-ply cloth by sewing yarn.

3. The head-protecting airbag according to claim 2, wherein the stitched-up portion has an inverted-U shape enclosing the mounting hole from upper side and front and rear sides.

4. The head-protecting airbag according to claim 2, wherein:
the airbag comprises a joint cloth prepared separately from the remaining part of the airbag and sewn to the remaining part as part of the non-admissive portion; and
the joint cloth is sewn to the remaining part of the airbag with the same sewing yarn as that for forming the stitched-up portion, at the same time as a sewing work of the stitched-up portion.

5. The head-protecting airbag according to claim 1, wherein:
the two-ply cloth part comprises connecting portions dotted about the cloth part, the connecting portions connecting vehicle's inner cloth part and outer cloth part of the two-ply cloth part together; and
each of the connecting portions is formed by weaving a warp or a weft of at least one of the inner or outer cloth part into the other cloth part.

6. The head-protecting airbag according to claim 1, wherein:
the two-ply region for defining the mounting portion is provided in a lower edge thereof with a slit extending along the front-rear direction of the airbag; and
the mounting portion is formed by folding back the two-ply region on a fold extending upward from an end of the slit.

* * * * *